United States Patent
Armstrong et al.

(10) Patent No.: US 8,316,169 B2
(45) Date of Patent: Nov. 20, 2012

(54) PHYSICAL TO HIERARCHICAL BUS TRANSLATION

(75) Inventors: William J. Armstrong, Rochester, MN (US); Scott N. Dunham, Raleigh, NC (US); David R. Engebretsen, Cannon Falls, MN (US); Gregory M. Nordstrom, Pine Island, MN (US); Steven M. Thurber, Austin, TX (US); Curtis C. Wollbrink, Rochester, MN (US); Adalberto G. Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/758,329

(22) Filed: Apr. 12, 2010

(65) Prior Publication Data

US 2011/0252167 A1  Oct. 13, 2011

(51) Int. Cl.
*G06F 13/00* (2006.01)
(52) U.S. Cl. ........................ 710/104; 710/305
(58) Field of Classification Search .......... 710/104, 710/305–306; 713/320
See application file for complete search history.

(56) References Cited

U.S. PATENT DOCUMENTS

| | | | | |
|---|---|---|---|---|
| 6,643,724 | B2 * | 11/2003 | Bauman et al. | 710/260 |
| 7,120,711 | B2 * | 10/2006 | Schaefer et al. | 710/104 |
| 7,506,084 | B2 | 3/2009 | Moertl et al. | |
| 7,587,575 | B2 | 9/2009 | Moertl et al. | |
| 7,590,817 | B2 | 9/2009 | Moertl et al. | |
| 7,600,093 | B2 | 10/2009 | Ben-Yehuda et al. | |
| 2006/0195617 | A1 | 8/2006 | Arndt et al. | |
| 2006/0195623 | A1 | 8/2006 | Arndt et al. | |
| 2007/0061549 | A1 | 3/2007 | Kaniyur et al. | |
| 2007/0067505 | A1 | 3/2007 | Kaniyur et al. | |
| 2007/0300241 | A1 | 12/2007 | Prakash et al. | |
| 2009/0037614 | A1 | 2/2009 | Saripalli | |
| 2009/0089464 | A1 | 4/2009 | Lach et al. | |
| 2009/0133016 | A1 | 5/2009 | Brown et al. | |
| 2009/0133028 | A1 | 5/2009 | Brown et al. | |
| 2009/0144731 | A1 | 6/2009 | Brown et al. | |

OTHER PUBLICATIONS

IBM Patent Application entitled "Hierarchical to Physical Bus Translation" filed by William J. Armstrong et al. on Apr. 12, 2010.
IBM Patent Application entitled "Hierarchical to Physical Memory Mapped Input/Output Translation" filed by William J. Armstrong et al. on Apr. 12, 2010.
IBM Patent Application entitled "Translating a Requester Identifier to a Chip Identifier" filed by William J. Armstrong et al. on Apr. 12, 2010.

* cited by examiner

*Primary Examiner* — Brian Misiura
*Assistant Examiner* — Kim Huynh
(74) *Attorney, Agent, or Firm* — Owen J. Gamon

(57) ABSTRACT

In an embodiment, a translation of a physical bus number to a hierarchical bus number is written to a south chip. The south chip receives a configuration write command that comprises a physical bus number. The south chip sends the configuration write command to a device via the bus identified by the physical bus number, and the device stores the physical bus number in the device. In response to a received message from a device that comprises the physical bus number, the south chip replaces the physical bus number in the message with the hierarchical bus number. The south chip sends the message to a north chip via a point-to-point serial link. Both the physical bus number and the hierarchical bus number identify a bus with which the device connects to a bridge in the south chip.

4 Claims, 7 Drawing Sheets

BUS TRANSLATION TABLE 145-1

| HIERARCHICAL BUS NUMBER (410) | PHYSICAL BUS NUMBER (411) | SOUTH CHIP BRIDGE ID (412) | |
|---|---|---|---|
| BUS A | BUS X | BRIDGE A | 401 |
| BUS B | BUS Y | BRIDGE B | 402 |
| BUS C | BUS Z | BRIDGE C | 403 |

FIG. 4

BUS TRANSLATION TABLE 147-1

| PHYSICAL BUS NUMBER (511) | HIERARCHICAL BUS NUMBER (510) | |
|---|---|---|
| BUS X | BUS A | 501 |
| BUS Y | BUS B | 502 |
| BUS Z | BUS C | 503 |

FIG. 5

PHYSICAL TO HIERARCHICAL BUS TRANSLATION

FIELD

An embodiment of the invention generally relates to computer systems and more particularly to computer system physical to hierarchical bus translation for computer system buses.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses can be parallel buses, which carry data words or multiple bits in parallel on multiple wires, or serial buses, which carry data in bit-serial form. A bus can be point-to-point, meaning that the bus connects only two components, or multi-drop, meaning that more than two components are connected to the bus. In a multi-drop bus, typically the bus has both data and address wires, and components connected to the bus listen for their unique destination address on the address wires, in order to discern whether data on the data wires is intended for them.

One example of a computer bus is called PCI EXPRESS (PERIPHERAL COMPONENT INTERCONNECT EXPRESS), which uses a network of point-to-point serial links. A pair of point-to-point PCI EXPRESS serial links makes up a lane. A hub routes the lanes and acts as a crossbar switch. This dynamic point-to-point behavior allows more than one pair of devices to communicate with each other at the same time. This format also allows channel grouping, where multiple lanes are bonded to a single device pair in order to provide higher bandwidth.

PCI EXPRESS devices communicate via a logical connection called an interconnect or link. A link is a point-to-point communication channel between two PCI EXPRESS ports, allowing both to send/receive ordinary PCI requests (e.g., configuration read/writes, I/O read/writes, and memory read/writes) and interrupts. At the physical level, a link comprises one or more lanes.

A lane comprises a transmit and a receive pair of differential lines. Each lane comprises four wires, meaning that, conceptually, each lane is a full-duplex byte stream, transporting packets containing the data in eight-bit byte format, between the two endpoints of a link, in both directions simultaneously. PCI EXPRESS transmissions send control messages, including interrupts, over the same links used for data.

SUMMARY

A method, computer-readable storage medium, and computer system are provided. In an embodiment, a translation of a physical bus number to a hierarchical bus number is written to a south chip. The south chip receives a configuration write command that comprises a physical bus number. The south chip sends the configuration write command to a device via the bus identified by the physical bus number, and the device stores the physical bus number. In response to a received message from a device that comprises the physical bus number, the south chip replaces the physical bus number in the message with the hierarchical bus number. The south chip sends the message to a north chip via a point-to-point serial link. Both the physical bus number and the hierarchical bus number identify a bus with which the device connects to a bridge in the south chip. The south chip sends an identifier of the bridge and an identifier of the device to an inventory controller, and the inventory controller determines the physical bus number.

BRIEF DESCRIPTION OF THE SEVERAL VIEWS OF THE DRAWINGS

FIG. 4 depicts a block diagram of an example data structure for a bus translation table, according to an embodiment of the invention.

FIG. 5 depicts a block diagram of another example data structure for a bus translation table, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
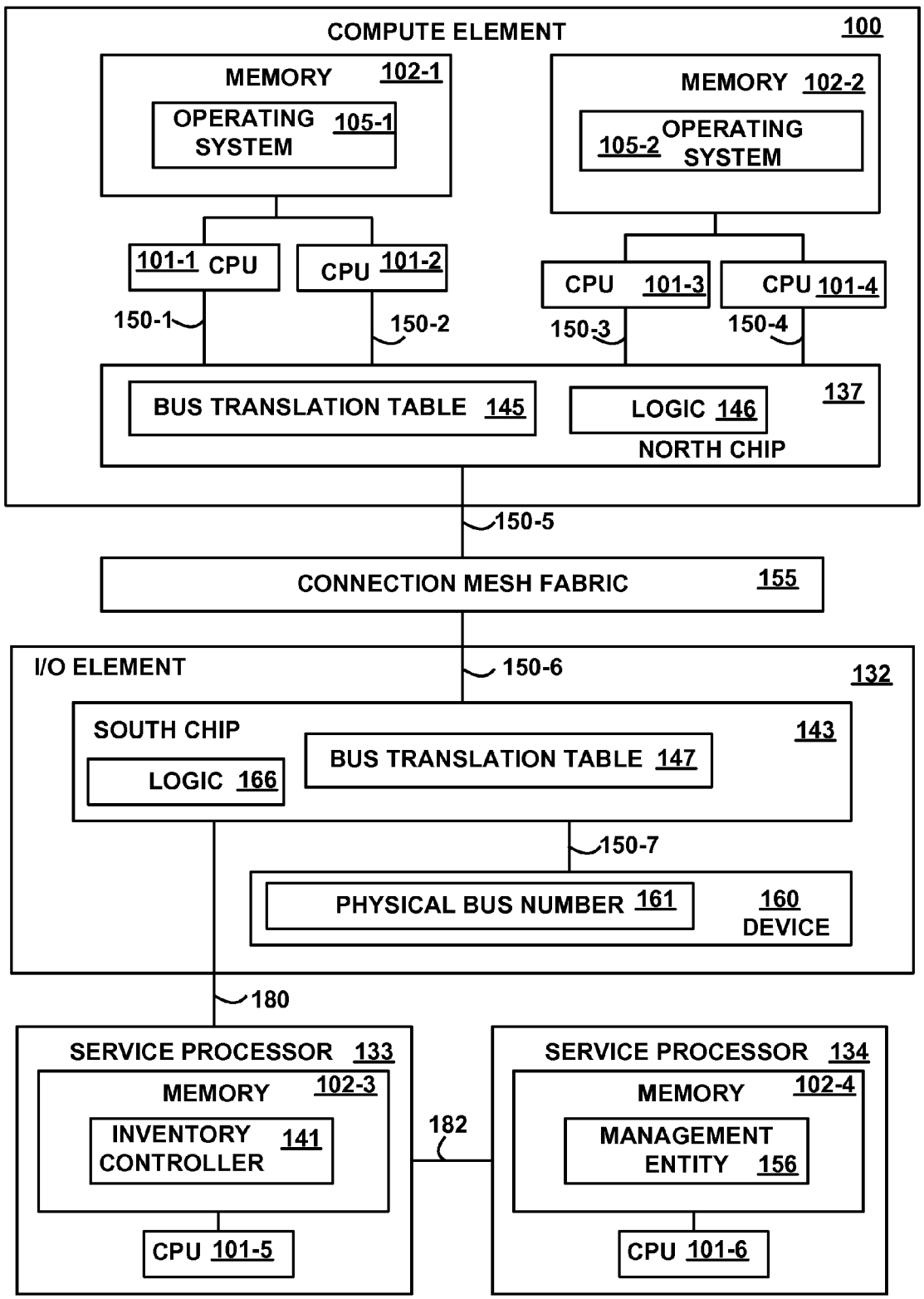
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system comprising the major components of a compute element 100 connected to an I/O (Input/Output) element 132 via a connection mesh fabric 155. The I/O element 132 is also connected to a service processor 133 via a communications link 180, and the service processor 133 is connected to another service processor 134 via a communications link 182.

The major components of the compute element 100 comprise memory 102-1, memory 102-2, central processing units (CPUs) 101-1, 101-2, 101-3, and 101-4, and a north chip 137. The CPUs 101-1 and 101-2 are connected to and share the memory 1021, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5.

In various embodiments, the compute element 100 is a multi-user mainframe computer system, single-user computer system, or a server computer or similar electronic device that has little or no direct user interface, but receives requests from other computer systems (clients). In other embodiments, the compute element 100 is implemented as a desktop computer, a portable computer, a laptop or notebook computer, a tablet computer, a pocket computer, a telephone, a smart phone, a pager, an automobile, a teleconferencing system, an instant messaging system, an appliance, or any other appropriate type of electronic device.

Each processor executes instructions stored in the memory 102-1 and 102-2, and each processor may also comprise cache memory. In various embodiments, the memory 102-1 and 102-2 are random-access semiconductor memory, storage devices, non-volatile memory, volatile memory, disk drives, or storage mediums for storing or encoding data and programs. The memory 102-1 and 102-2 are conceptually single monolithic entities, but in other embodiments the memory 102-1 and 102-2 are more complex arrangements, such as hierarchies of caches and/or other memory devices. For example, the memory 102-1 and 102-2 may exist in multiple levels of memory devices of varying sizes and speeds.

The memories 102-1 and 102-2 store or encode respective operating systems 105-1 and 105-2, which, when executed on the processors, control the operations of the compute element 100. In another embodiment, the operating systems 105-1 and 105-2 may be implemented as any executable instructions or interpretable statements such as a user application or a third-party application. The compute element 100 may use virtual addressing mechanisms that allow the programs of the compute element 100 to behave as if they only have access to a large, single storage entity instead of access to multiple, smaller storage entities. Thus, all portions of an operating system 105-1 and 105-2 are not necessarily completely contained in the same storage device at the same time.

In various embodiments, the north chip 137 is implemented as a chip, integrated circuit, circuit board, logic devices, memory, and/or a processor. The north chip 137 comprises a bus translation table 145 and logic 146. The bus translation table 145 is stored in memory (analogous to the memory 102-1 or 102-2) and comprises a translation or mapping of hierarchical bus numbers to physical bus numbers and bridge identifiers, as further described below with reference to FIG. 4.

In an embodiment, the logic 146 is implemented as a chip, circuits, or logic devices. In another embodiment, the logic 146 comprises memory encoded with instructions or statements and a processor on which the instructions or statements execute or are interpreted. The logic 146 performs processing, operations, or functions, as further described below with reference to FIGS. 6, 7, and 8.

In an embodiment, the connection mesh fabric 155 comprises a point-to-point serial connection between the compute element 100 and the I/O element 132. In other embodiments, the connection mesh fabric 155 may be any suitable network or combination of networks and may support any appropriate protocol suitable for communication of data and/or code to/from the compute element 100 and the I/O element 132. In an embodiment, the connection mesh fabric 155 may be implemented via an Ethernet network, but in other embodiments any appropriate network or combination of networks implementing any appropriate protocol may be used.

In various embodiments, the I/O element 132 is implemented as a system element, an electronic device, an endpoint, a computer, or a circuit board. The I/O element 132 comprises a south chip 143 connected to a device 160 via a bus 150-7. The south chip 143 is further connected to the connection mesh fabric 155 via a bus 150-6. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element I/O 100 or the I/O element 132. In another embodiment, the chips 137 and 143 are different, and each is customized for its respective element.

The south chip 143 comprises a bus translation table 147 and logic 166. The bus translation table 147 is stored in memory (analogous to the memory 102-1 or 102-2) and comprises a translation or mapping of physical bus numbers to hierarchical bus numbers, as further described below with reference to FIG. 5. In an embodiment, the logic 166 is implemented as a chip, circuits, or logic devices. In another embodiment, the logic 166 comprises memory encoded with instructions or statements and a processor on which the instructions or statements execute or are interpreted. The logic 166 performs processing, operations, or functions, as further described below with reference to FIGS. 6, 7, and 8.

In an embodiment, the device 160 comprises a storage device or a combination of storage devices, either connected within the I/O element 132 or connected directly or indirectly to the I/O elements 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 stores or encodes in memory (analogous to the memory 102-1 or 102-2) a physical bus number 161, which identifies or names the bus 150-7 with which the device 160 connects to a bridge in the south chip 143. The physical bus number 161 may comprise any identifying information, such as characters, numbers, symbols, images, or any multiple, combination, or representation thereof.

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, and 150-4, 150-5, 150-6, and 150-7 are point-to-point serial buses, such as the PCI EXPRESS bus, but in other embodiments, any appropriate bus may be used. Furthermore, buses 150-1, 150-2, 150-3, 150-4, 150-5, 150-6, and 150-7 may comprise memory buses, I/O buses, I/O bus interface units, I/O processors, or any multiple and/or combination thereof.

The service processor 133 comprises memory 102-3 connected via a bus to a CPU 101-5. The memory 102-3 stores or encodes an inventory controller 141. The service processor 134 comprises memory 102-4 connected via a bus to a CPU 101-6. The memory 102-4 stores or encodes a management entity 156. In an embodiment, the inventory controller 141 and/or the management entity 156 comprise instructions or statements that execute or are interpreted by instructions that execute on the respective CPUs 101-5 and 101-6. In another embodiment, the inventory controller 141 and/or the management entity 156 comprise circuits or logic devices in lieu of or in addition to a processor based system. The inventory controller 141 performs processing, operations, or functions, as further described below with reference to FIGS. 6 and 7. The management entity 156 performs processing, operations, or functions, as further described below with reference to FIG. 7. The memory 102-3 and 102-4 may be implemented analogous to the memory 102-1 and 102-2. The CPUs 101-5 and 101-6 may be implemented analogous to the CPUs 101-1, 101-2, 101-3, or 101-4.

It should be understood that FIG. 1 is intended to depict the representative major components of the compute elements 100, the connection mesh fabric 155, the I/O elements 132, the service processor 133, and the service processor 134 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, the service processor 133, and/or the service processor 134 and that, when read and executed by one or more processors in the compute element 100, the I/O element 132, the service processor 133, and/or the service processor 134 or when interpreted by instructions that are executed by one or more processors, cause the compute element 100, the I/O element 132, the service processor 133, and/or the service processor 134 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a compute element via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a compute element to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
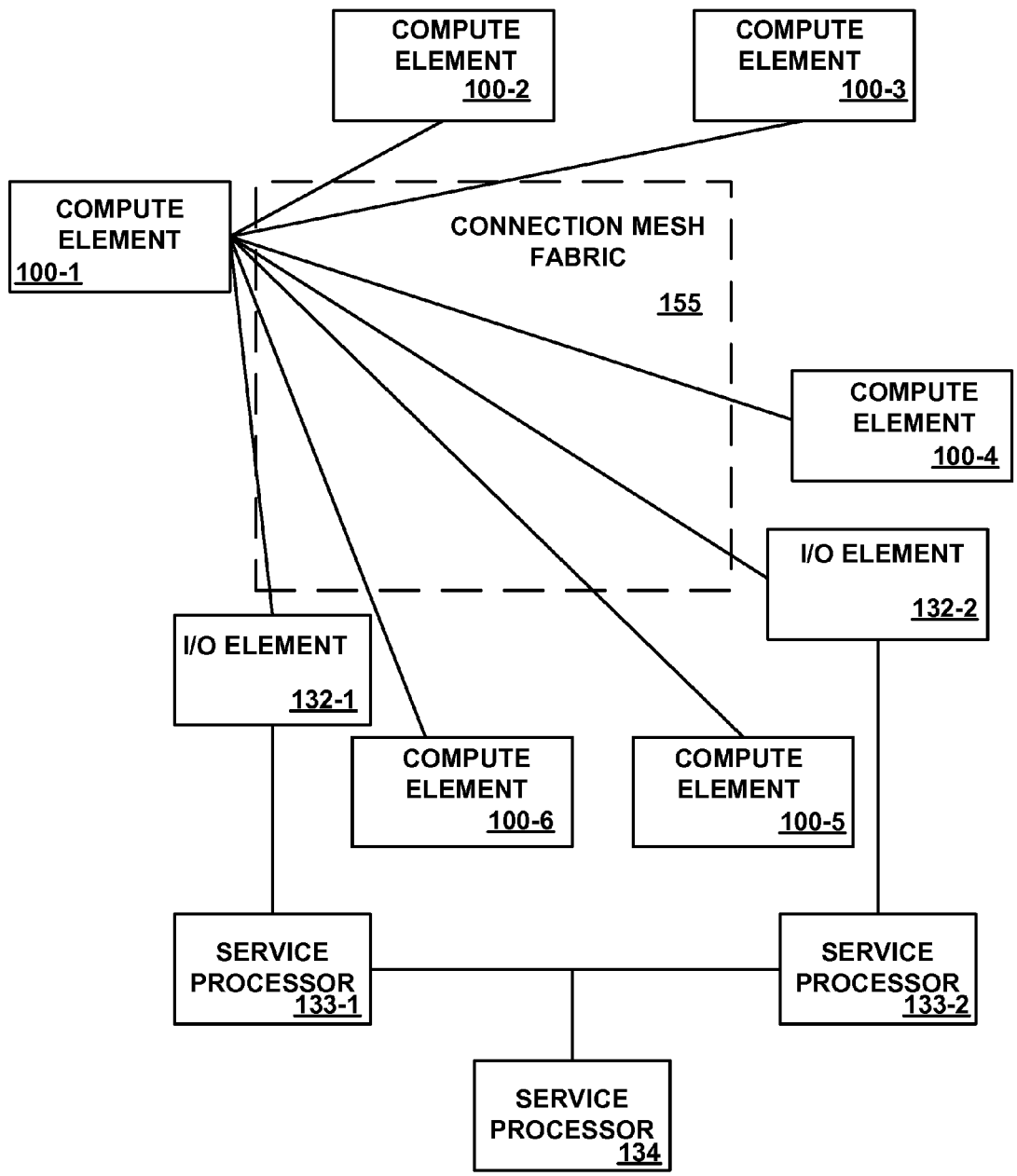
FIG. 2 depicts a block diagram illustrating the interaction of selected components of an embodiment of the invention.

FIG. 2 depicts a block diagram illustrating the interaction of selected components of an embodiment of the invention. The compute elements 100-1, 100-2, 100-3, 100-4, 100-5, 100-6, and I/O elements 132-1 and 132-2 are connected via the connection mesh fabric 155. The compute elements 100-1, 100-2, 100-3, 100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. For convenience of illustration, FIG. 2 depicts compute element 100-1 as connected to every other compute and I/O element 100-2, 100-3, 100-4, 100-5, 100-6, 132-1, and 132-2. But, each compute and I/O element is connected to each and every other compute and I/O element via high speed point-to-point links in an interconnection of everything-to-everything, which is referred to as the connection mesh fabric 155. Thus, if one point-to-point link fails, elements may still communicate to each other by hopping though another element. In an embodiment, the connection mesh fabric 155 is not necessarily confined to a single chassis or rack, but may span multiple chassis or racks.

In a serial communication link, data is sent one bit at a time, sequentially over a single channel, wire, or bus. Serial communication is in contrast to parallel communication, where several bits are sent together, on a link with several parallel channels or wires.

FIG. 2 also illustrates the service processors 133-1 and 133-2 connected to respective I/O elements 132-1 and 132-2. The I/O elements 132-1 and 132-2 are examples of, and are generically referred to by, the I/O element 132 (FIG. 1). The service processors 133-1 and 133-2 are examples of, and are generically referred to by, the service processor 133 (FIG. 1). Thus, referring again to FIG. 2, each I/O element 132-1 and 132-2 is connected to a respective different service processor 133-1 and 133-2, which is local to its respective I/O element. The service processors 132-1 and 132-2 are further connected to the service processor 134.

Figure 3:
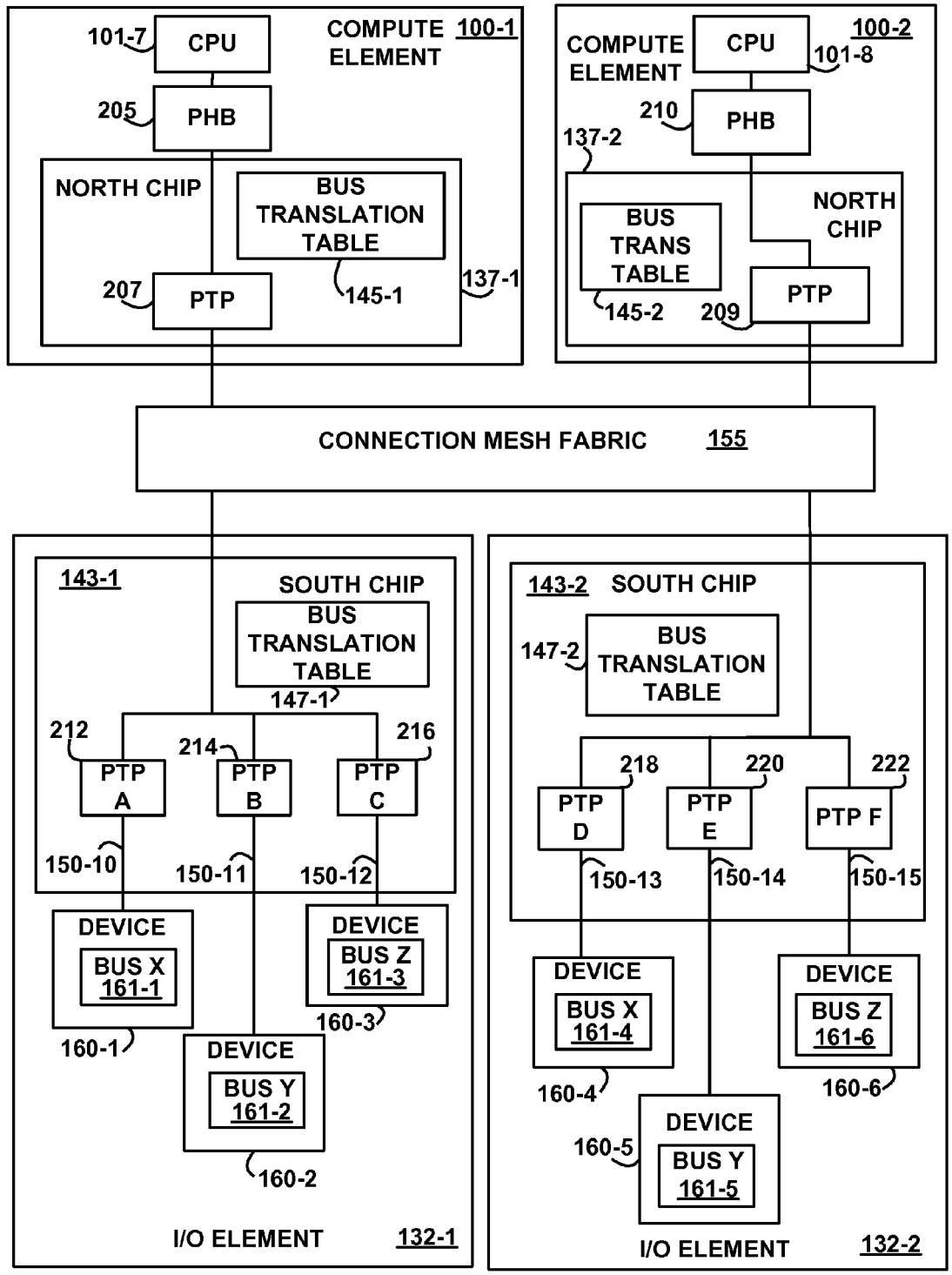
FIG. 3 depicts a block diagram illustrating more detail of selected components of an embodiment of the invention.

FIG. 3 depicts a block diagram illustrating more detail of selected components of an embodiment of the invention. As illustrated in FIG. 3, the compute elements 100-1 and 100-2 are connected via the connection mesh fabric 155 to the I/O elements 132-1 and 132-2.

The compute element 100-1 comprises a CPU 101-7 connected via a bus to a PHB (Peripheral Component Interconnect Host Bridge) 205, which is connected via a different bus to a north chip 137-1. The CPU 101-7 is an example of the CPUs 101-1, 101-2, 101-3, or 101-4 (FIG. 1). A bridge is an electronic component that forwards packets of data between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used.

The north chip 137-1 comprises a PTP (PCI to PCI) bridge 207, meaning that both the ingress and the egress bus that are connected to respective ingress and egress ports of the PTP 207 are PCI buses. The north chip 137-1 further comprises a bus translation table 145-1, which is an example of, and is generically referred to by, the bus translation table 145 (FIG. 1). The north chip 137-1 is an example of, and is generically referred to by, the north chip 137 (FIG. 1).

The compute element 100-2 comprises a CPU 101-8 connected via a bus to a PHB 210, which is connected via a different bus to a north chip 137-2. The CPU 101-8 is an example of the CPUs 101-1, 101-2, 101-3, or 101-4 (FIG. 1). The north chip 137-2 comprises a PTP (PCI to PCI bridge) 209, meaning that both the ingress and the egress bus that are connected to respective ingress and egress ports of the PTP 209 are PCI buses. The north chip 137-2 further comprises a bus translation table 145-2, which is an example of, and is generically referred to by, the bus translation table 145 (FIG. 1). The north chip 137-2 is an example of, and is generically referred to by, the north chip 137 (FIG. 1).

The I/O element 132-1 comprises a south chip 143-1 connected to devices 160-1, 160-2, and 160-3 via respective buses 150-10, 150-11, and 150-12. The south chip 143-1 comprises a PTP A 212, a PTP B 214, and a PTP C 216. Each of the PTP A 212, the PTP B 214, and the PTP C 216 comprises a respective egress port, which is connected to the connection mesh fabric 155 via an egress bus. The egress port is a transmitting port, meaning that the PTP sends signals to the connection mesh fabric 155 via the egress port and egress bus. Each of the PTP A 212, the PTP B 214, and the PTP C 216 further comprises an ingress port, which is connected to respective devices 160-1, 160-2, and 160-3 via respective ingress buses 150-10, 150-11, and 150-12.

An ingress port is a receiving port, meaning that the PTP receives signals on a bus from a device via the ingress port. In an embodiment, the buses 150-10, 150-11, and 150-12, are point-to-point serial buses, such as the PCI EXPRESS bus, but in other embodiments, any appropriate bus may be used. In an embodiments, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element to a device and from a device to a compute element).

In the example of FIG. 3, the bus 150-10 has a physical bus number of "BUS X." The bus 150-11 has a physical bus number of "BUS Y." The bus 150-12 has a physical bus number of "BUS Z." A physical bus number is an identifier of a bus that connects a device to ingress port of a PTP in a south chip 143. An inventory controller 141 assigns the physical bus number to the ingress bus of the PTP, and the devices 160-1, 160-2, and 160-3 store in memory the bus names 161-1, 161-2, and 161-3 of the buses with which they connect to their respective PTPs 212, 214, and 216.

The I/O element 132-2 comprises a south chip 143-2 connected to devices 160-4, 160-5, and 160-6 via respective buses 150-13, 150-14, and 150-15. The south chip 143-2 comprises a PTP D 218, a PTP E 220, and a PTP F 222. Each of the PTP D 218, the PTP E 220, and the PTP F 222 comprises an egress port, which is connected to the connection mesh fabric 155 via a bus. Each of the PTP D 218, the PTP E 220, and the PTP F 222 further comprises an ingress port, which is connected to respective devices 160-4, 160-5, and 160-6 via respective ingress buses 150-13, 150-14, and 150-15. In an embodiment, the ingress buses 150-13, 150-14, and 150-15, are point-to-point serial buses, such as the PCI EXPRESS bus, but in other embodiments, any appropriate bus may be used.

The bus 150-13 has a physical bus number of both "BUS X." The bus 150-14 has a physical bus number of "BUS E." The bus 150-14 has a physical bus number of "BUS Z." A physical bus number is an identifier of a ingress bus that is connected to the ingress port of a PTP in a south chip 143. An inventory controller 141 assigns the physical bus number to the ingress bus of the PTP, and the devices 160-4, 160-5, and 160-6 store in memory the bus names 161-4, 161-5, and 161-6 of the buses with which they connect to their respective PTPs 218, 220, and 222.

As illustrated in FIG. 3, the physical bus numbers are unique within an I/O element and within a south chip 143 because an inventory controller 141 that is local and is connected to the I/O element assigns the bus names within a south chip 143 for all buses connected to the south chip 143. But, bus names are not necessarily unique across all south chips 143 because a different inventory controller 141 may assign the buses names to buses in different I/O elements 132.

The devices 160-1, 160-2, 160-3, 160-4, 160-5, and 160-6 are examples of the device 160 (FIG. 1). Each of the devices 160-1, 160-2, 160-3, 160-4, 160-5, and 160-6 stores or encodes in its memory a respective physical bus number 161-1, 161-2, 161-3, 161-4, 161-5, and 161-6, which names or identifies the respective bus 150-10, 150-11, 150-12, 150-13, 150-14, and 150-15, with which the respective device connects to the respective PTP bridge 212, 214, 216, 218, 220, and 222. The physical bus number 161 (FIG. 1) generically refers to the physical bus numbers 161-1, 161-2, 161-3, 161-4, 161-5, and 161-6.

FIG. 4 depicts a block diagram of an example data structure for a bus translation table 145-1, according to an embodiment of the invention. The bus translation table 145-1 is an example of, and is generically referred to by, the bus translation table 145 (FIG. 1). Each north chip 137 may comprise its own bus translation table with different, partially different, or the same data because each compute element 100 may use its own hierarchical bus numbers to reference devices within the south chips.

Referring again to FIG. 4, the bus translation table 145-1 comprises example rows 401, 402, and 403, each of which comprises a hierarchical bus number field 410, a physical bus number field 411, and a south chip bridge identifier field 412. The hierarchical bus number field 410 specifies a name or identifier of an ingress bus within a south chip 143 that is specified by the south chip bridge identifier field 412 in the same row. A device connects via the ingress bus to a PTP bridge in the south chip that is identified by the south chip bridge identifier field 412. The values in the hierarchical bus number field 410 are unique within the compute element 100-1 that assigns them, but are not necessarily unique within a south chip 143 or across all south chips 143.

The physical bus number field 411 specifies an identifier or name 161 of an ingress bus in the south chip 143 that is identified by the south chip bridge identifier field 412 in the same row. The ingress bus that is named by hierarchical bus number 410 and the physical bus number 411 within the same row is the same bus, but may have a hierarchical bus number 410 that is different from its physical bus number 411. Thus, the bus translation table 145-1 represents a mapping or translation of hierarchal bus numbers 410 used by the compute element 100-1 to physical bus numbers 412 for an ingress bus connected to a bridge identified by the south chip bridge identifier 412. The south chip bridge identifier field 412 specifies the bridge within a south chip 143 to which the bus that is identified by both the hierarchical bus number 410 and the physical bus number 411, in the same row, connects.

In an embodiment, the physical bus numbers 411 are unique within an I/O element 132, but might not be unique across I/O elements because different respective inventory controllers 141 that are locally connected to each respective I/O element 132 assign the physical bus numbers 411.

FIG. 5 depicts a block diagram of another example data structure for a bus translation table 147-1, according to an embodiment of the invention. Each south chip 143 may comprises its own bus translation table with different, partially different, or the same data from bus translation tables in other south chips.

The example bus translation table 147-1 comprises example rows 501, 502, and 503, each of which comprises a hierarchical bus number field 510 and a physical bus number field 511. The hierarchical bus number field 510 specifies a name or identifier of an ingress bus within a south chip 143. A device connects via the ingress bus to a PTP bridge in the south chip 143. The values in the hierarchical bus number field 510 are unique within the compute elements 100 that assign them, but are not necessarily unique across all compute elements 100, within a south chip 143, or across all south chips 143. In an embodiment, the compute elements assign their hierarchical bus numbers independently of each other.

The physical bus number field 511 specifies an identifier or name 161 of a physical ingress bus in the south chip 143-1 that comprises the bus translation table 147-1. The hierarchical bus number 510 and the physical bus number 511 within the same row both identify and name the same bus, but the hierarchical bus number 510 may be different from the physical bus number 511. Thus, the bus translation table 147-1 represents a mapping or translation of hierarchal bus numbers 510 used by all compute elements 100 to physical bus numbers 511 in the same row for an ingress bus connected to a bridge within the south chip 143-1, which comprises the bus translation table 147-1.

In an embodiment, the physical bus numbers 511 are unique within an I/O element 132, but might not be unique across I/O elements because the respective inventory controller 141 that is local to each respective I/O element 132 assigns the physical bus numbers 511.

Because each compute element 100-1 and 100-2 assigns its own hierarchical bus numbers, the compute elements 100-1 and 100-2 may use the same hierarchical bus number to refer to different physical buses in the same or different south chips. Further, because each compute element 100-1 and 100-2 assigns its own hierarchical bus numbers, the compute elements 100-1 and 100-2 may use different hierarchical bus numbers to refer to the same physical bus. Thus, the same physical bus number in the same bus translation table in the same south chip may map to multiple hierarchical bus numbers that are used and assigned by multiple compute elements.

Figure 6:
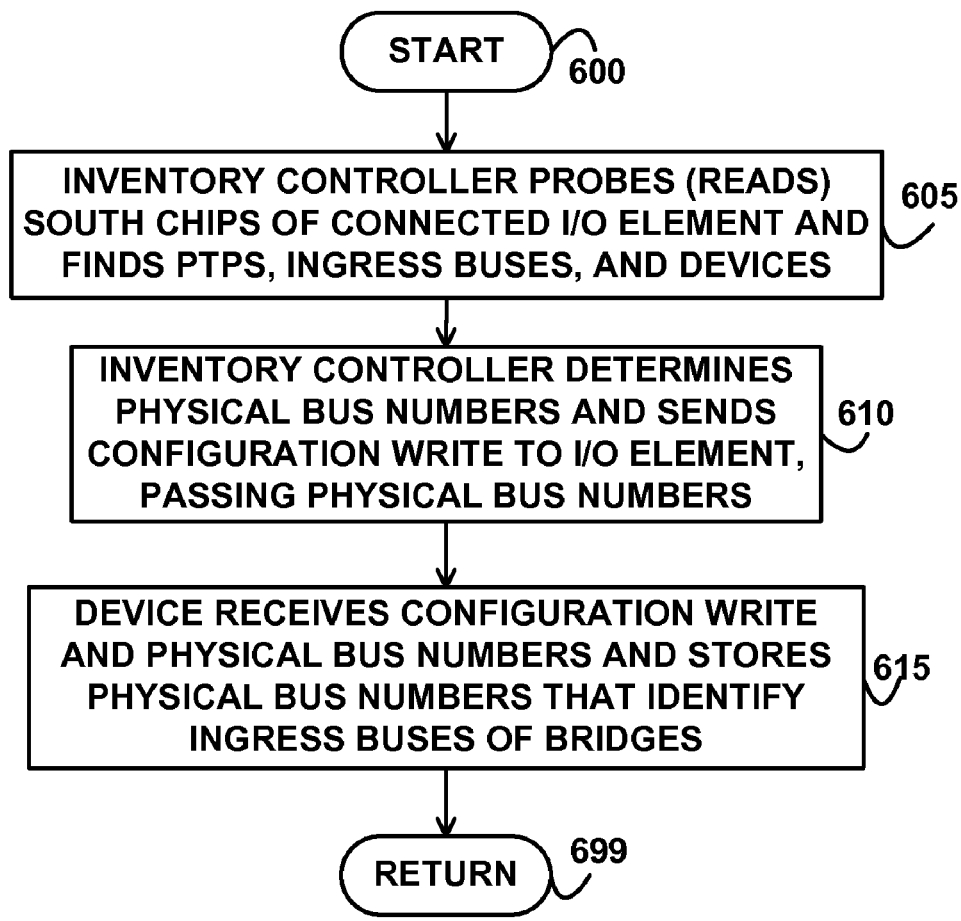
FIG. 6 depicts a flowchart of example processing for an inventory controller, according to an embodiment of the invention.

FIG. 6 depicts a flowchart of example processing for an inventory controller, according to an embodiment of the invention. Each inventory controller 141 performs the processing of FIG. 6 for its respective connected I/O element. Control begins at block 600.

Control then continues to block 605 where the inventory controller 141 probes (reads) the south chip 143 of the I/O element 132 that is connected to the inventory controller 141 and finds the PTP bridges in the south chip 143 and the ingress buses that connect to the PTP bridges in that I/O element 132. The inventory controller 141 sends a request or command to its locally connected I/O element 132 that requests data that describes the PTP bridges, the buses of the south chip 143, and the devices 160 that connect to the buses. In response, the south chip 143 sends, to the inventory controller 141, the south chip bridge identifiers of the PTP bridges in the south chip 143 and indications that the PTP bridges are connected via ingress buses to devices and identifiers of the connected devices.

Control then continues to block 610 where the inventory controller 141, in response to receiving the south chip bridge identifiers and indications of buses from the south ship, determines the physical bus numbers of the buses that connect to the bridges identified by the received south chip bridge identifiers and sends a configuration write command to the I/O element 132, passing the physical bus numbers of the ingress buses that connect to the PTPs in the south chip 143 and the identifiers of the devices 160 to which the buses identified by the physical bus numbers connect.

In various embodiments, the inventory controller 141 determines the physical bus numbers randomly or by incrementing a counter, with each successive bus having a number or identifier that is one more or a certain number more than the previous bus. In other embodiments, the inventory controller 141 uses any appropriate technique for assigning physical bus numbers that uniquely identify ingress buses that connect the devices 160 to PTP bridges within an I/O element 132.

Control then continues to block 615 where the south chip 143 sends the respective configuration write to the respective device on the bus identified by the physical bus number. The device 160 receives the respective configuration write command and the respective physical bus number. Each of the devices 160 stores to memory the physical bus number 161 that identifies the respective egress bus of the respective PTP bridge to which that respective device 160 connects to its respective PTP bridge. Each device 160 uses its physical bus number as part of a requestor identifier to identify the device 160 when the device 160 sends 160 commands, requests, or replies to a compute element 100 via the ingress bus that connects the device 160 to the ingress port of the south chip 143. Control then continues to block 699 where the logic of FIG. 6 returns.

Figure 7:
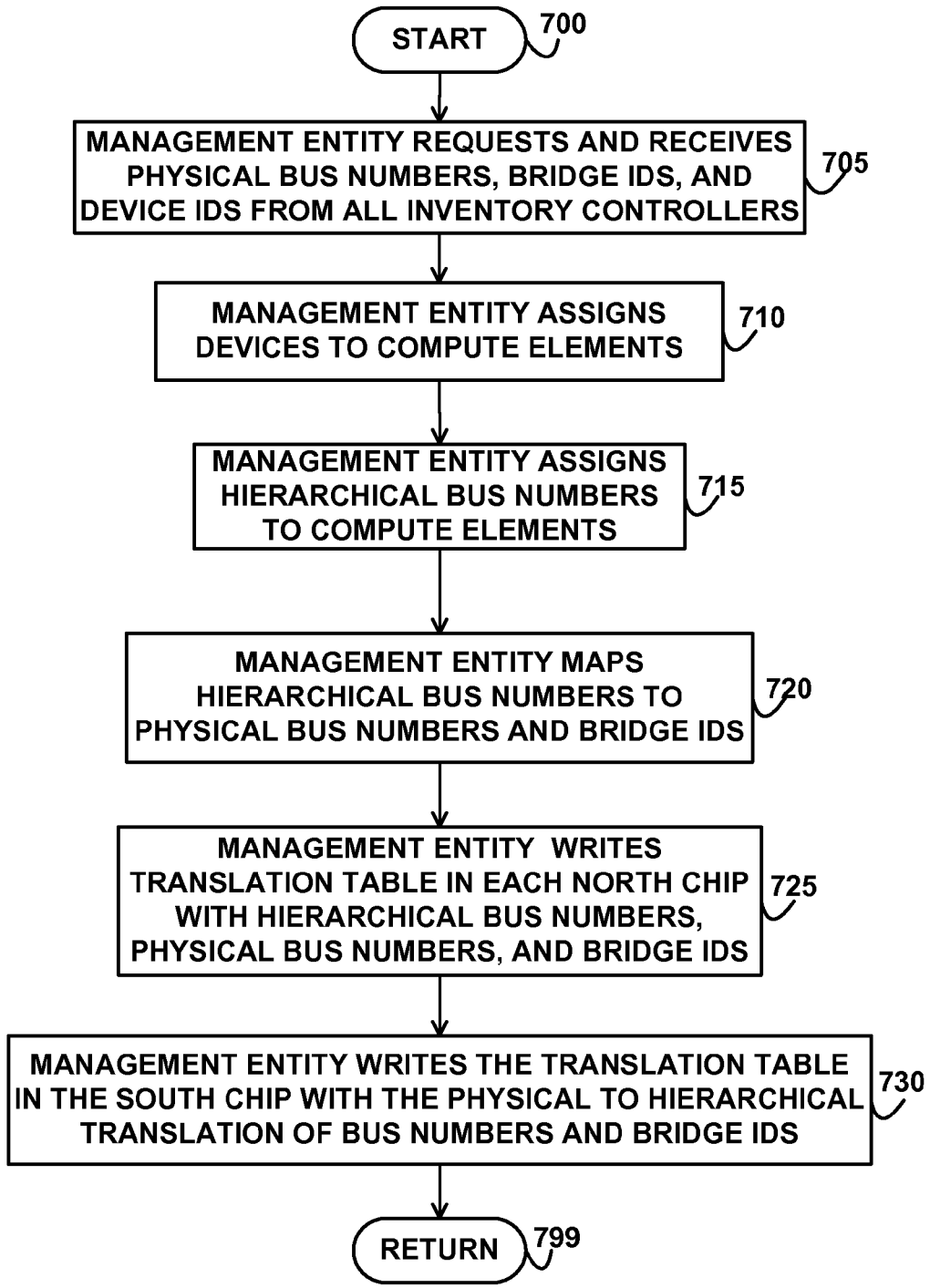
FIG. 7 depicts a flowchart of example processing for a management entity, according to an embodiment of the invention.

FIG. 7 depicts a flowchart of example processing for a management entity, according to an embodiment of the invention. Control begins at block 700. Control then continues to block 705 where the management entity 156 requests and receives the physical bus numbers, bridge identifiers, and device identifiers from all of the inventory controllers 141. The physical bus numbers identify ingress buses that connect the devices 160 to the bridges identified by the bridge identifiers within the I/O elements 132 to which the inventory controllers 141 are connected.

Control then continues to block 710 where the management entity 156 assigns the various devices 160 to the various compute elements 100. For example, the management entity 156 assigns the device 160-6 to the compute element 100-2, assigns the device 160-1 to the compute element 100-1, and assigns the device 160-4 to both the compute elements 100-1 and 100-2. Assigning a device to a compute element 100 means that the management entity 156 sends identifiers of the assigned devices to the compute element 100 to which the device 160 is assigned, sends identifiers of the assigned compute elements 100 to the devices 160, gives the compute element 100 permission to read/write data from/to their assigned devices 160 and, and gives the devices 160 permission to read/write data to/from their assigned compute elements 100. The compute elements 100 subsequently send read/write commands to their assigned devices 160 and do not send read/write commands to devices 160 to which they are not assigned. The devices 160 also initiate commands to and reply to commands from the compute elements 100 to which the devices 160 are assigned.

In various embodiments, the management entity 156 may determine the assignment of devices 160 to compute elements 100 from requests or commands entered via a user interface or by matching the type of a compute element 100 to a type of the device 160. In various embodiments, the management entity 156 assigns a device 160 with a type that indicates a network device 160 to a compute element 100 with a type that indicates it contains an application server that responds to queries from a network and assigns another device 160 with a type that indicates a storage device controller to a compute element 100 with a type that indicates it contains a database server that reads/writes from/to a database that is stored in a storage device.

Control then continues to block 715 where the management entity 156 assigns hierarchical bus numbers to compute elements 100. That is, in response to receiving their assigned device identifiers from the management entity 156, the compute elements 100 assign hierarchical bus numbers to the buses that the assigned devices 160 use to connect to the PTP bridges within the south chip 143 and send the hierarchical bus numbers to the management entity 156. The management entity 156 receives the hierarchical bus numbers from the compute elements 100.

Control then continues to block 720 where the management entity 156 maps hierarchical bus numbers to the physical bus numbers and the bridge identifiers. That is the management entity 156 determines the mapping or translation of the hierarchical bus numbers that the compute elements 100 assign to the physical bus numbers and the bridge identifiers that the inventory controller 141 assigns by matching the device identifiers that the management entity 156 assigned to the compute elements 100 to the device identifiers of the devices 160 that are connected to the bridge identified by the bridge identifier via the bus identified by the physical bus number. In response to finding those device identifiers that match (or are identical), the management entity 156 assigns a mapping or translation of the corresponding hierarchical bus numbers to physical bus numbers for the same matching device identifier.

Control then continues to block 725 where the management entity 156 sends the translation tables 145 to each north chip 137 with the mapping or translation of the hierarchical bus numbers to the physical bus numbers and the bridge identifiers. The north chips 137 receive the mapping or translation data and write it to the bus translation table 145. For example, the north chip 137-1 writes the mapping or translation data into the fields 410, 411, and 412 for the rows 401, 402, and 403 of the bus translation table 145-1.

Control then continues to block 730 where the management entity 156 sends the bus translation tables 147, with the mapping or translation of the hierarchical bus numbers to the physical bus numbers, to each south chip 143. The south chips 143 receive their respective mapping or translation data and write it to their respective bus translation tables 147. For example, the south chip 143-1 writes the mapping or translation data into the fields 510 and 511 for the rows 501, 502, and 503 of the bus translation table 147-1.

Control then continues to block 799 where the logic of FIG. 7 returns.

Figure 8:
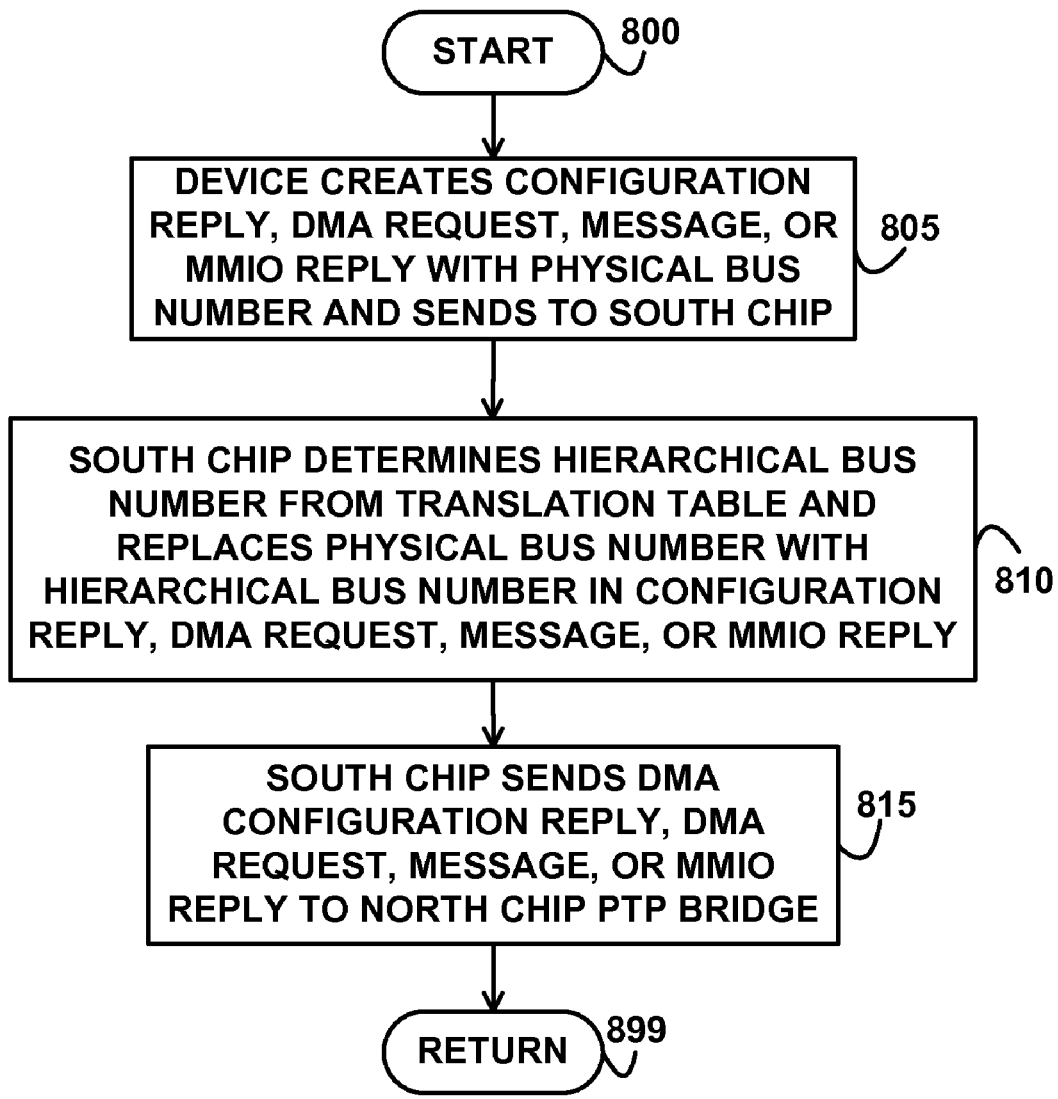
FIG. 8 depicts a flowchart of example processing of a reply, request, or message from a device, according to an embodiment of the invention.

FIG. 8 depicts a flowchart of example processing of a reply, request, or message from a device, according to an embodiment of the invention. Control begins at block 800.

Control then continues to block 805 where the device creates a configuration reply, a DMA (Direct Memory Access Request), a message, or a Memory Mapped Input/Output (MMIO) reply that comprises the physical bus number 161 of the device. The device sends the reply, DMA request, or message to the south chip 143 via the bus 150-7 that is identified by the physical bus number 161.

Control then continues to block 810 where the south chip 143 receives the reply, DMA request, or message via the bus 150-7 identified by the physical bus number 161 and the PTP bridge that connects to the bus 150-7. In response to receiving the reply, DMA request, or message, the south chip 143 determines the hierarchical bus number from the bus translation table that identifies the same bus as does the received physical bus number 161 and replaces that physical bus number with the determined hierarchical bus number in the reply, DMA request, or message. That is, the south chip 143 finds the received physical bus number in a row in the bus translation table 147 that matches or is identical to the received physical bus number, reads the hierarchical bus number from the same row as the matched physical bus number, and replaces the read physical bus with the read hierarchical bus number in the reply, the DMA request, or the message.

Control then continues to block 815 where the south chip 143 sends the reply, DMA request, or message to the north chip via the connection mesh fabric 155. The north chip receives the reply, DMA, request, or message via the PTP 207 or 209 and sends the reply, DMA request, or message to the operating system executing on the CPU. The operating system processes the reply, DMA request, or message and/or stores the reply, DMA request, or message. Control then continues to block 899 where the logic of FIG. 8 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A computer system comprising:
  a first compute element comprising a north chip;
  an first input/output element connected to the first compute element via a connection mesh fabric, wherein the first input/output element comprises a south chip that stores a translation of a physical bus number to a hierarchical bus number, wherein the physical bus number and the hierarchical bus number identify a bus with which the first device connects to a bridge in the south chip, receives a message from the first device, wherein the message comprises the physical bus number, wherein in response to the message, the south chip replaces the physical bus number with the hierarchical bus number in the message and sends the message to the north chip;
  a first service processor connected to the first input/output element, wherein the first service processor comprises an inventory controller that receives a bridge identifier of the bridge and a device identifier of the first device from the south chip and in response determines the physical bus number and sends a configuration write command that comprises the physical bus number to the south chip, wherein the south chip receives the configuration write command that comprises the physical bus number from the inventory controller and sends the configuration write command to the first device via the bus identified by the physical bus number, wherein the first device stores the physical bus number in the first device;
  a plurality of input/output elements comprising a plurality of south chips connected to a plurality of devices, wherein the device identifier of the first device is not unique across the plurality of devices connected to the plurality of south chips; and a plurality of compute elements, wherein the first compute element assigns the first hierarchical bus number to the bus independently of the plurality of compute elements that assign a plurality of hierarchical bus numbers to the bus.

2. The computer system of claim 1, wherein the connection mesh fabric further comprises a point-to-point serial link between the north chip and the south chip, and wherein the south chip sends the message to the north chip via the point-to-point serial link.

3. The computer system of claim 1, wherein the inventory controller determines the physical bus number to uniquely identify the bus within the input/output element.

4. The computer system of claim 1, further comprising:

a second service processor connected to the first service processor, wherein the second service processor comprises a management entity that creates the translation by matching the device identifier that is assigned to the first compute element to the device identifier of the first device that is connected to the bridge identified by the bridge identifier via the bus identified by the physical bus number and sends the translation to the south chip.

* * * * *